United States Patent
Vega

(10) Patent No.: US 6,496,112 B1
(45) Date of Patent: Dec. 17, 2002

(54) RADIO FREQUENCY IDENTIFICATION TAG WITH A PROGRAMMABLE CIRCUIT STATE

(75) Inventor: Victor Allen Vega, Hercules, CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/045,357

(22) Filed: Mar. 20, 1998

Related U.S. Application Data

(63) Continuation-in-part of application No. 09/041,480, filed on Mar. 12, 1998, now Pat. No. 6,040,773, and a continuation-in-part of application No. 09/031,848, filed on Feb. 27, 1998.

(51) Int. Cl.[7] ............................................. H04Q 5/22
(52) U.S. Cl. .................. 340/572.1; 340/10.1; 340/10.3; 340/10.4; 340/572.4; 340/572.7
(58) Field of Search .................... 340/572, 825.54, 340/825.49, 10.33, 10.34, 10.1, 10.3, 10.4, 572.1, 572.4, 572.7

(56) References Cited

U.S. PATENT DOCUMENTS

| | | | |
|---|---|---|---|
| 3,843,036 A | 10/1974 | Monahan et al. ............... 228/6 |
| 4,783,646 A | 11/1988 | Matsuzaki ................... 340/572 |
| 4,900,386 A | 2/1990 | Richter-Jorgensen ....... 156/267 |
| 4,970,495 A | 11/1990 | Matsumoto et al. ........ 340/568 |
| 5,051,741 A | * 9/1991 | Wesby .................... 340/825.49 |
| 5,081,445 A | 1/1992 | Gill et al. ................... 340/572 |
| 5,175,418 A | 12/1992 | Tanaka ........................ 235/439 |
| 5,288,235 A | 2/1994 | Sobhani ........................ 439/67 |
| 5,430,441 A | 7/1995 | Bickley et al. ......... 340/825.54 |
| 5,446,447 A | * 8/1995 | Carney et al. ............... 340/572 |
| 5,450,087 A | * 9/1995 | Hurta et al. .................. 342/42 |
| 5,528,222 A | 6/1996 | Moskowitz et al. ......... 340/572 |
| 5,566,441 A | 10/1996 | Marsh et al. ................... 29/600 |
| 5,673,037 A | * 9/1997 | Cesa et al. .............. 340/825.54 |
| 5,682,143 A | 10/1997 | Brady et al. ................. 340/572 |
| 5,710,458 A | 1/1998 | Iwasaki ........................ 257/679 |
| 5,786,626 A | 7/1998 | Brady et al. ................. 257/673 |
| 5,847,447 A | 12/1998 | Rozin et al. ................. 257/678 |
| 5,850,187 A | 12/1998 | Carrendar et al. ...... 340/825.54 |
| 5,854,480 A | 12/1998 | Noto ........................... 235/492 |
| 6,001,211 A | 12/1999 | Hiroyuki ..................... 156/277 |
| 6,094,173 A | * 7/2000 | Nylander ..................... 343/742 |
| 6,211,799 B1 | 4/2001 | Post et al. | |

FOREIGN PATENT DOCUMENTS

| | | |
|---|---|---|
| DE | 40 17 934 C2 | 1/1992 |
| EP | 0 245 196 A2 | 11/1987 |
| EP | 0 260 221 A3 | 3/1988 |
| EP | 0 260 221 A2 | 3/1988 |

* cited by examiner

Primary Examiner—Michael Horabik
Assistant Examiner—M Shimizu
(74) Attorney, Agent, or Firm—Wayne J. Egan; Terri S. Hughes

(57) ABSTRACT

A radio frequency identification tag (16) includes stored tag information (56) and at least one antenna element (30). The tag also includes a programmable tag circuit state that is either "on" or "off" based on an "on/off" command signal (35) received by the antenna element. When the tag circuit state is "on," upon receiving an exciter signal (34) from a proximately-located electrostatic exciter (12), the tag becomes energized, thereby causing it to generate a read signal (38) containing a carrier signal (58) and based on the stored tag information. The antenna element then electrostatically sends the read signal to a proximately-located reader (14), which detects the carrier signal and, under proper conditions, also the stored tag information.

14 Claims, 3 Drawing Sheets

RADIO FREQUENCY IDENTIFICATION TAG WITH A PROGRAMMABLE CIRCUIT STATE

CROSS-REFERENCE TO RELATED APPLICATIONS

This is a continuation-in-part of commonly-assigned prior U.S. patent application Ser. No. 09/031,848 filed Feb. 27, 1998 by Victor Allen Vega et al., entitled "Radio frequency identification tag system using tags arranged for coupling to ground," the disclosure of which prior application is hereby incorporated by reference, verbatim and with the same effect as though such disclosure were fully and completely set forth herein. Also, this is a continuation-in-part of commonly-assigned U.S. patent application Ser. No. 09/041, 480 now U.S. Pat. No. 6,040,773 filed Mar. 12, 1998 by Victor Allen Vega et al., entitled "Radio frequency identification tag arranged for magnetically storing tag state information," the disclosure of which prior application is hereby incorporated by reference, verbatim and with the same effect as though such disclosure were fully and completely set forth herein.

FIELD OF THE INVENTION

The present invention relates generally to the field of radio-frequency identification tags including, but not limited to, a radio frequency identification tag with a programmable circuit state.

BACKGROUND OF THE INVENTION

Radio frequency identification ("RFID") tags and radio frequency identification tag systems are known, and find numerous uses. For example, radio frequency identification tags are frequently used for personal identification in automated gate sentry applications protecting secured buildings or areas. Information stored on the radio frequency identification tag identifies the person seeking access to the secured building. Older systems require the person accessing the building to insert or swipe a programmed identification tag into or through a reader for the system to read the information from the identification tag. A radio frequency identification tag conveniently reads the information from the radio frequency identification tag at a small distance using radio frequency ("RF") data transmission technology eliminating the inserting or swiping operation. Most typically, the user simply holds or places the radio frequency identification tag near a base station, which is coupled to a security system securing the building or area. The base station transmits an excitation signal to the radio frequency identification tag that powers circuitry contained on the radio frequency identification tag. The circuitry, responsive to the excitation signal, communicates the stored information from the radio frequency identification tag to the base station, which receives and decodes the information. The read information is communicated to the security system and, if appropriate, access is granted to the individual. In general, radio frequency identification tags are capable of retaining and, in operation, transmitting a substantial amount of information—sufficient information to uniquely identify individuals, packages, inventory and the like.

A typical technology for powering and reading a radio frequency identification tag is inductive coupling or a combination of inductive power coupling and capacitive data coupling. Inductive coupling requires incorporating a coil element into the radio frequency identification tag. The coil element is excited (or "energized") by an excitation signal from a base station to provide power to the radio frequency identification tag circuitry. The radio frequency identification tag coil, or a second tag coil, may be used to transmit and receive the stored information between the radio frequency identification tag and the base station. Inductive coupling technology is relatively expensive, particularly for applications where it may be desirable to have a disposable radio frequency identification tag such as in an inventory management application. Radio frequency identification tags relying on inductive coupling are also sensitive to orientation of the radio frequency identification tag with respect to the base station since the field created by the excitation signal must intersect the coil element at substantially a right angle for effective coupling. Furthermore, read ranges for inductively coupled devices are generally on the order of several centimeters. Longer read distances are desirable, and for certain applications, such as electronic animal identification, baggage tracking, parcel tracking and inventory management applications, are necessary.

Other radio frequency identification tag technologies include magnetically coupled, magnetically and electrostatically coupled technologies. While offering certain performance enhancements, and in some cases cost advantages, over inductive coupling technology, read ranges with these other technologies remain unacceptably short. For example, in an electronic article surveillance ("EAS") system, it is necessary to read the radio frequency identification tag as it passes through a standard doorway. Similarly, because of the vast differences in sizes of parcels and baggage an ability to read the radio frequency identification tag at a substantial distance is imperative. As will be further appreciated orientation of the radio frequency identification tag with respect to the base station can not be prearranged, and therefore, can not be allowed to substantially effect read distances. Each of the mentioned technologies tends to be overly orientation sensitive.

Magnetic coupling technologies have found some success in EAS systems by providing sufficiently large read ranges. For example, a magnetic strip and detection technology is available from 3M of St. Paul, Minn. (sold under the product name "Tattle Tape"). The magnetic strips are small and thin thus allowing for easy insertion within the pages or spines of books, jewel cases of CDs, and the like. Magnetic strip technology, however, is information limited. That is, the magnetic strips are capable of providing only a single bit of information—typically indicating authorization yes/no for removal from the secured area. Magnetic strip technology is not capable of providing a sufficient amount of data for unique identification, and as such, is not suitable for automated inventory applications.

Another important consideration for EAS system operation is sensitivity. A person attempting to illegally remove an article from a secured area is likely not to pause while passing through a sensing area of the surveillance system to allow the system time to detect the status of the article. Magnetic strip technology offers good sensitivity.

Magnetic strip technology, however, is also not suitable for applications where the protected media is magnetic in nature. The magnetic strip is coded and decoded by subjecting the strip to a magnetic field. Subjecting magnetically recorded media, such as videotape, recorded audio tape, computer diskettes, and the like to magnetic fields may damage the recorded media.

Radio frequency identification tag technology offers the significant advantage of storing and conveying sufficient information so as to uniquely identify persons, retail articles, parcels, packages, baggage and the like. However, radio frequency identification tag technology is limited in application by cost, read range and sensitivity. Magnetic strip technology offers the advantage of long read range, and based upon the limited amount of data conveyed, fast verification. But, because of the limited amount of information it is capable of conveying and the requirement of using a magnetic field for programming, magnetic strip technology is limited in application. In addition, magnetic strip technology is costly.

Thus, there is a need for an improved radio frequency identification tag.

BRIEF DESCRIPTION OF THE DRAWINGS

Preferred exemplary embodiments of the invention are illustrated in the accompanying drawings in which like reference numerals represent like parts throughout.

DESCRIPTION OF THE PREFERRED EMBODIMENTS

Briefly, a radio frequency identification tag includes stored tag information and at least one antenna element. The tag also includes a programmable tag circuit state that is either "on" or "off" based on an "on/off" command signal received by the antenna element. When the tag circuit state is "on," upon receiving an exciter signal from a proximately-located electrostatic exciter, the tag becomes energized, thereby causing it to generate a read signal containing a carrier signal and based on the stored tag information. The antenna element then electrostatically sends the read signal to a proximately-located reader, which detects the carrier signal and, under proper conditions, also the stored tag information.

Figure 1:
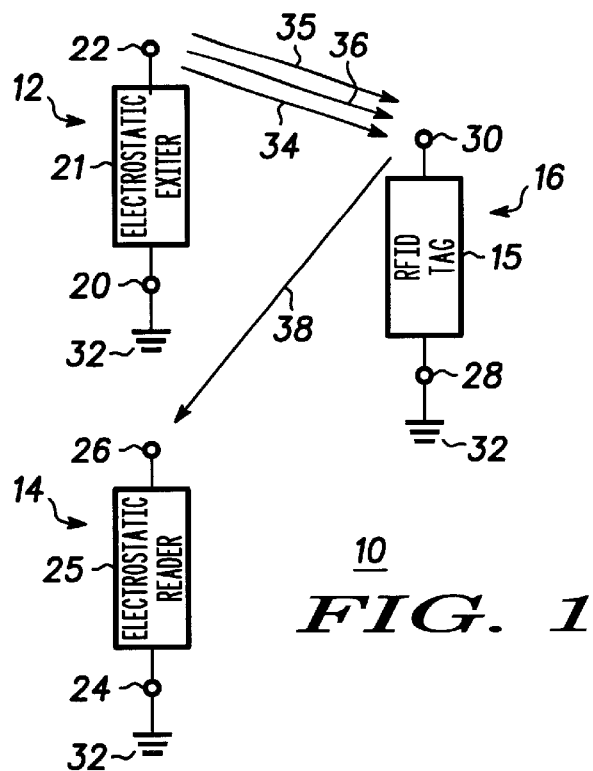
FIG. 1 is a block diagram illustration of a radio frequency identification tag system in accordance with a preferred embodiment of the present invention.

With reference to FIG. 1 of the drawings, a radio frequency identification tag system 10 includes: 1) a proximately-located electrostatic exciter 12, 2) a proximately-located electrostatic reader 14, and 3) a radio frequency identification tag 16. Electrostatic exciter 12 includes an exciter common electrode 20 and an exciter antenna element 22 coupled to an exciter circuit 21. Electrostatic reader 14 includes a reader common electrode 24 and a reader antenna element 26 coupled to a reader circuit 25. Radio frequency identification tag 16 includes a tag common electrode 28 and a tag antenna element 30 coupled to a tag circuit 15. In the preferred implementation of the invention shown, exciter common electrode 20, reader common electrode 24 and tag common electrode 28 are coupled to ground 32.

Electrostatic exciter 12 provides an exciter signal 34. When radio frequency identification tag 16 is proximate electrostatic exciter 12, exciter signal 34 is electrostatically coupled, through the air, from exciter antenna element 22 to tag antenna element 30. Radio frequency identification tag 16 becomes energized based upon exciter signal 34. In accordance with a programmed tag circuit state and stored tag information of radio frequency identification tag 16, radio frequency identification tag 16 generates a read signal 38 containing at least a carrier signal and some or all of the stored tag information, which is communicated from tag circuit 15 to tag antenna element 30. Read signal 38 is electrostatically coupled from tag antenna element 30 to reader antenna element 26. Electrostatic reader 14 receives read signal 38, demodulates/decodes read signal 38 to recover the stored tag information therefrom and, as appropriate, communicates the stored tag information to other system elements (not shown). In a preferred implementation, read signal 38 is a reflected signal modulated by means of reflected load modulation based upon the stored tag information. It will be appreciated that other forms of modulation such as amplitude modulation (AM), frequency modulation (FM) or phase modulation (PM) may be used to convey the stored tag identification.

Electrostatic exciter 12 may be advantageously constructed from available tag exciter circuitry, such as for example, Motorola Indala's ASR-120 base station (part no. 05200-006 available from Motorola Indala Corporation, 3041 Orchard Parkway, San Jose, Calif. 95134). The ASR-120 device is adapted by forming and coupling a suitable exciter electrode, for example a copper plate electrode, to one of the dipole electrode connections thereby forming the exciter antenna element 22. The other dipole electrode connection is coupled to earth thereby forming exciter common electrode 20. As the ASR-120 is also adaptable to receive from a radio frequency identification tag the read signal, one will appreciate that it may be further adapted to include the reader antenna element coupled to the read electrode connection.

Figure 5:
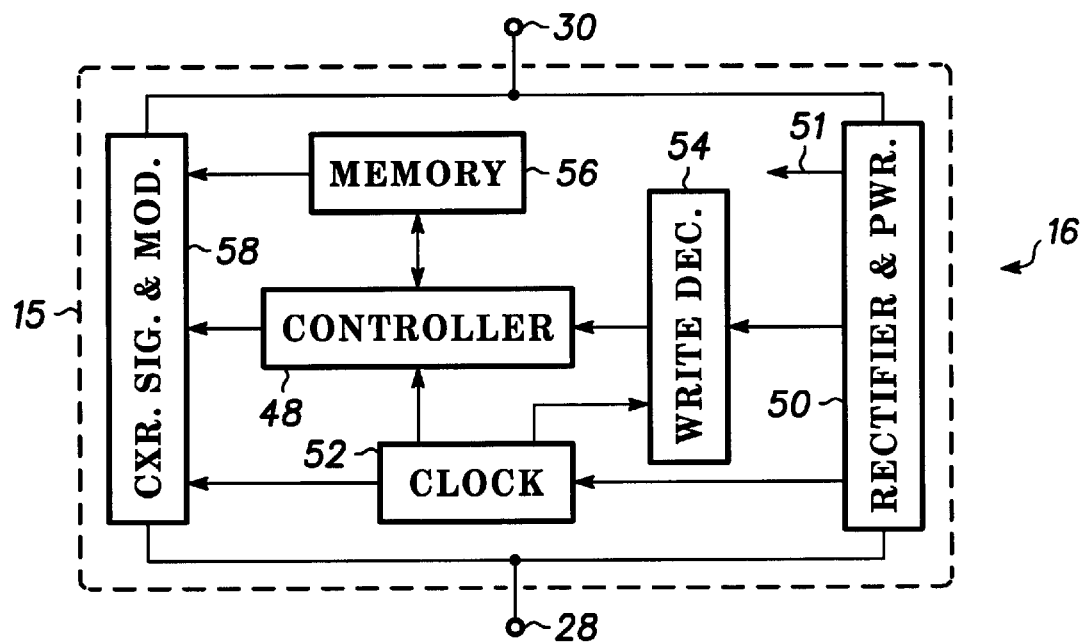
FIG. 5 is a block diagram illustration of a radio frequency identification tag in accordance with a preferred embodiment of the present invention.

Referring now to FIG. 5, in a read/write embodiment of the present invention radio frequency identification tag is advantageously constructed from a TEMIC e5550 circuit chip (available from Temic North America, Inc., Basking Ridge, N.J.). In this regard, and with reference to FIG. 5, tag circuit 15 includes operatively coupled: 1) a rectifier and tag power circuit 50, 2) a clock circuit 52, 3) a write decoder circuit 54, 4) a memory 56, 5) a carrier signal and/or modulator circuit 58 and 6) a controller 48. More particularly, tag antenna element 30 is coupled to both rectifier and tag power circuit 50 and to carrier signal and/or modulator circuit 58, which in turn are respectfully coupled to tag common electrode 28. Rectifier and tag power circuit 50 receives exciter signal 34 via tag antenna element 30 and provides a direct current (dc) power supply 51. Exciter signal 34 is further coupled via rectifier and tag power circuit 50 to write decoder circuit 54 and clock circuit 52. Clock circuit 52 provides a clock signal to each of write decoder circuit 54, carrier signal and/or modulator circuit 58 and controller 48. Memory 56 retains the stored tag information and is accessed by controller 48 and carrier signal and/or modulator 58. In an alternate read-only embodiment, a derivative of the Indala 1341 circuit chip available from the aforementioned Motorola Indala Corporation may be used. It will be appreciated that in this alternate read-only embodiment write decoder circuit 54 is not included.

Upon excitation, carrier signal and/or modulator circuit 58 generates read signal 38 with the appropriate modulation and couples it to tag antenna element 30. As described, read signal 38 is preferably a reflected signal containing the carrier signal and modulated via load modulation. It will be appreciated, however, that other modulations, such as amplitude modulation (AM), frequency modulation (FM) and phase modulation (PM) may be used to convey the stored tag information. Tag common electrode 28 is arranged to couple to ground. In a preferred embodiment (not shown), tag common electrode 28 may be arranged to couple to a person or an animal. In this manner, tag common electrode 28 is coupled to ground by means of the person or animal. Tag common electrode 28 may also be arranged to couple to an article (not shown). In this manner, tag common electrode 28 is coupled to ground by means of the article. In preferred applications, the article may be a loaned, leased or rented article, such as, for example, a video medium, an audio medium, a computer program, a computer game, a video game or a book. The article may also be a retail sales article such as, for example, an item of clothing such as a dress, skirt, blouse, shirt, coat, pair of jeans, pants, or other garment.

In accordance with a preferred embodiment of the present invention, radio frequency identification tag 16 is arranged to include a programmable tag circuit state. Tag antenna element 30 is arranged for receiving an "on/off" command signal 35 from electrostatic exciter 12. Controller 48 is arranged for setting the tag circuit state based upon "on/off" command signal 35. Preferably the tag circuit state is exactly one state of an "on" state and an "off" state. When the tag circuit state is "on", tag circuit 15 is arranged to generate the read signal containing the carrier signal and to couple the read signal to tag antenna element 30. When the tag circuit state is "off", tag circuit 15 ceases to generate the read signal.

In a preferred embodiment, the tag 16 is associated with an article, and a first state of the tag's two circuit states is used to indicate when the article is authorized for removal from a secured area, while the second state is used to indicate when the article is not authorized for removal from the secured area. The programmed nature of the tag circuit state permits high sensitivity detection. That is, radio frequency identification tag system 10 may be arranged to quickly detect the "on/off" state of the tag circuit based on generation of the read signal, i.e., the presence of the carrier signal in the read signal, without attempting to decode the stored tag information contained in the read signal. As a result, detection of the programmed tag circuit state provides effective electronic article security (EAS), while detection of the stored tag information provides asset identification and/or inventory control.

With continued reference to FIG. 1 and FIG. 5, in a read/write embodiment, electrostatic exciter 12 is arranged to transmit a transmitted write signal 36 to radio frequency identification tag 16. Most preferably, transmitted write signal 36 is a modulation of exciter signal 34. Within tag circuit 15, write decoder circuit 54 decodes, i.e., demodulates, transmitted write signal 36 to recover the write information and communicates the write information to controller 48. Controller 48 initiates a write operation during which the write information is communicated to and retained within memory 56 as part of the stored tag information. The updated stored tag information forms the basis for read signal 38. It will be appreciated that the transmitted write signal 36 may be an operation code or command. In this case, write decoder circuit 54 is arranged to decode the operation code or command.

Figure 2:
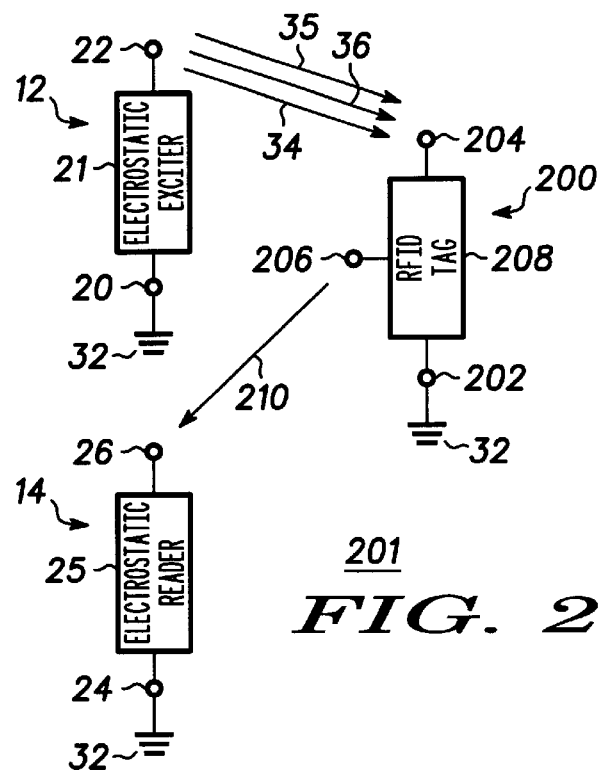
FIG. 2 is a block diagram illustration of a radio frequency identification tag system in accordance with an alternate preferred embodiment of the present invention.
Figure 6:
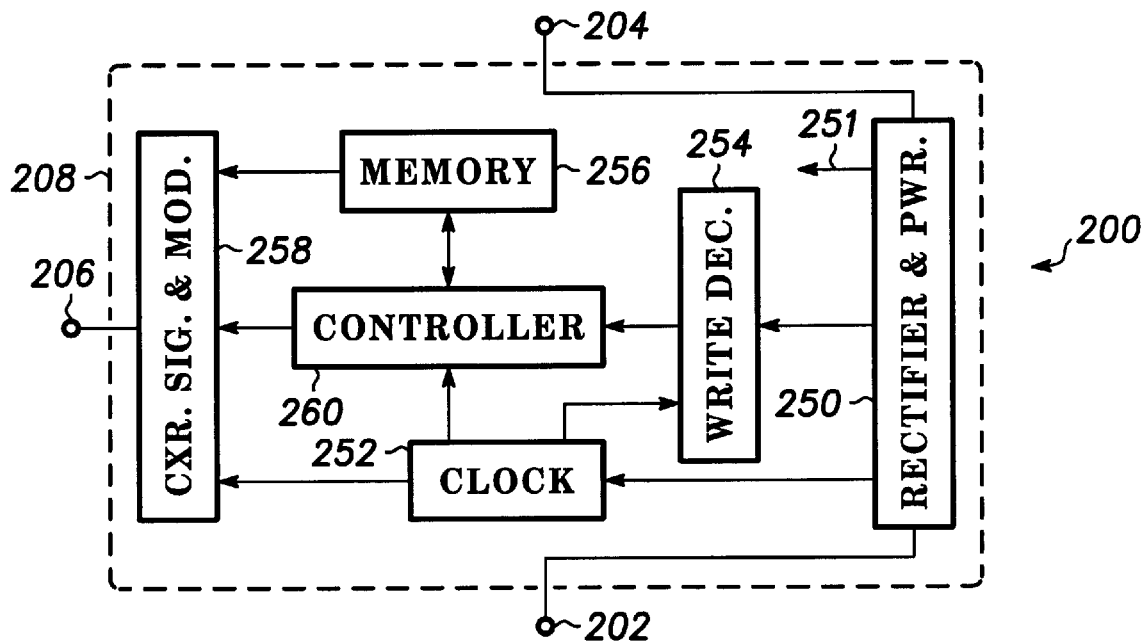
FIG. 6 is a block diagram illustration of a radio frequency identification tag in accordance with a preferred embodiment of the present invention.

With reference to FIG. 2 and FIG. 6, a radio frequency identification tag system 201 includes: 1) a proximately-located electrostatic exciter 12, 2) a proximately-located electrostatic reader 14, and 3) a radio frequency identification tag 200. Electrostatic exciter 12, and electrostatic reader 14 are arranged as discussed with respect to radio frequency identification tag system 10 above. Radio frequency identification tag 200 includes a tag common electrode 202, a first tag antenna element 204 and a second tag antenna element 206 coupled to a tag circuit 208. In the preferred implementation of the invention shown, exciter common electrode 20, reader common electrode 24 and tag common electrode 202 are coupled to ground 32.

Electrostatic exciter 12 provides an exciter signal 34. When radio frequency identification tag 200 is proximate electrostatic exciter 12, exciter signal 34 is electrostatically coupled, through the air, from exciter antenna element 22 to first tag antenna element 204. Radio frequency identification tag 200 becomes energized based upon exciter signal 34. In accordance with a programmed tag circuit state and stored tag information of radio frequency identification tag 200, radio frequency identification tag 200 generates a read signal 210 containing a carrier signal and some or all of the stored tag information, which is communicated from tag circuit 208 to second tag antenna element 206. Read signal 210 is electrostatically coupled from second tag antenna element 206 to reader antenna element 26. Electrostatic reader 14 receives read signal 210, demodulates/decodes read signal 210 to recover the stored tag information therefrom and, as appropriate, communicates the stored tag information to other system elements (not shown). In a preferred implementation, read signal 210 is a transmitted signal containing the carrier signal and modulated by means of an amplitude modulation (AM), a frequency modulation (FM) or a phase modulation (PM) to convey the stored tag identification.

Referring to FIG. 6, in a read/write embodiment of the present invention radio frequency identification tag 200 is advantageously constructed from a derivative of the aforementioned TEMIC e5550 circuit chip. In this regard, and with reference to FIG. 6, tag circuit 208 includes operatively coupled: 1) a rectifier and tag power circuit 250, 2) a clock circuit 252, 3) a write decoder circuit 254, 4) a memory 256, 5) a carrier signal and/or modulator circuit 258 and 6) a controller 260. More particularly, first tag antenna element 204 is coupled to rectifier and tag power circuit 250, and carrier signal and/or modulator circuit 258 is coupled to second tag antenna element 206. Upon becoming energized by exciter signal 34, rectifier and tag power circuit 250 provides a direct current (dc) power supply 251. Exciter signal 34 is further coupled from first tag antenna element 204 via rectifier and tag power circuit 250 to write decoder circuit 254 and clock circuit 252. Clock circuit 252 provides a clock signal to each of write decoder circuit 254, carrier signal and/or modulator circuit 258 and controller 260. Memory 256 retains the stored tag information and is accessed by controller 260 and carrier signal and/or modulator circuit 258. In an alternate read-only embodiment, a derivative of the aforementioned Motorola Indala 1341 circuit chip may be used. It will be appreciated that in this alternate read-only embodiment write decoder circuit 254 is not included.

Upon excitation, carrier signal and/or modulator circuit 258 generates a read signal 210 with an appropriate modulation and couples it to second tag antenna element 206. Preferably read signal 210 is a transmitted signal containing the carrier signal and modulated by means of at least one of an amplitude modulation, a frequency modulation or a phase modulation based upon the stored tag information. Read signal 210 is electrostatically coupled from second tag antenna element 206 to reader antenna element 26.

Tag common electrode 202 is arranged to couple to ground. In a preferred embodiment (now shown), tag common electrode 202 may be arranged to couple to a person or an animal. In this manner, tag common electrode 202 is coupled to ground by means of the person or animal. Tag common electrode 202 may also be arranged to couple to an article (not shown). In this manner, tag common electrode 202 is coupled to ground by means of the article. In preferred applications, the article may be a loaned, leased or rented article, such as, for example, a video medium, an audio medium, a computer program, a computer game, a video game or a book. The article may also be a retail sales article.

In accordance with a preferred embodiment of the present invention, radio frequency identification tag 200 is arranged to include a programmable tag circuit state. First tag antenna element 204 is arranged for receiving the "on/off" command signal 35 from electrostatic exciter 12. Controller 260 is arranged for setting the tag circuit state based upon "on/off" command signal 35. Preferably the tag circuit state is exactly one state of an "on" state and an "off" state. When the tag circuit state is "on", tag circuit 208 is arranged to generate the read signal containing the carrier signal and to couple the read signal to first tag antenna element 204. When the tag circuit state is "off", tag circuit 208 ceases to generate the read signal.

In a preferred embodiment, similar to tag 16 discussed above, the tag 200 is associated with an article, and a first state of the tag's two circuit states is used to indicate when the article is authorized for removal from a secured area, while the second state is used to indicate when the article is not authorized for removal from the secured area. The programmed nature of the tag circuit state permits high sensitivity detection. That is, radio frequency identification tag system 201 may be arranged to quickly detect the "on/off" state of the tag circuit based on generation of the read signal, i.e., the presence of the carrier signal in the read signal, without attempting to decode the stored tag information contained in the read signal. As a result, detection of the programmed tag circuit state provides effective electronic article security (EAS), while detection of the stored tag information provides asset identification and/or inventory control.

Figure 3:
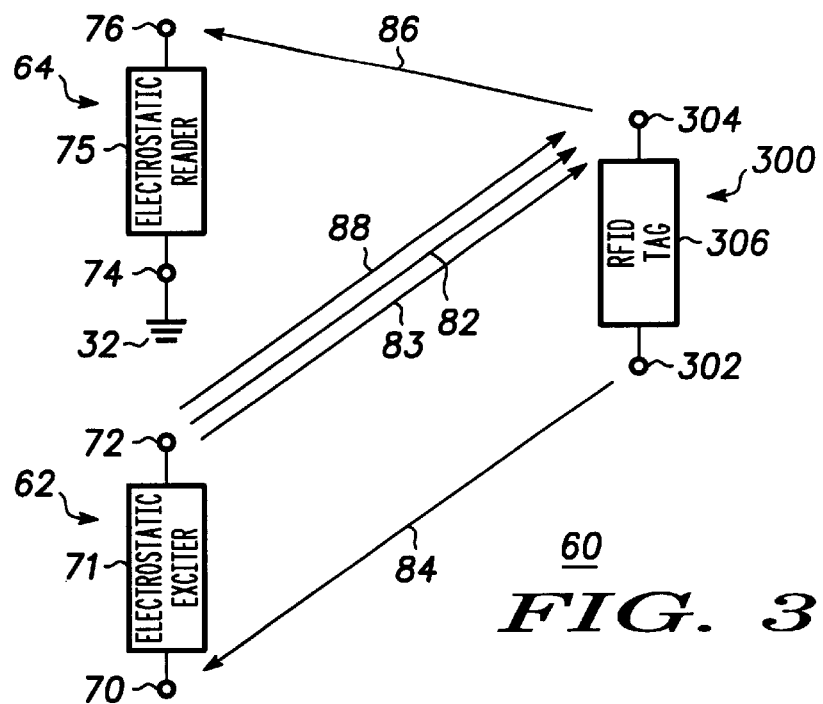
FIG. 3 is a block diagram illustration of a radio frequency identification tag system in accordance with an alternate preferred embodiment of the present invention.

With continued reference to FIG. 2 and FIG. 6, in a read/write embodiment, electrostatic exciter 12 is arranged to transmit a transmitted write signal 36 to radio frequency identification tag 200. Most preferably, transmitted write signal 36 is a modulation of exciter signal 34. Within tag circuit 208, write decoder circuit 254 decodes, i.e., demodulates, transmitted write signal 36 to recover the write information and communicates the write information to controller 260. Controller 260 initiates a write operation during which the write information is communicated to and retained within memory 256 as part of the stored tag information. The updated stored tag information forms the basis for read signal 210. It will be appreciated that the transmitted write signal 36 may be an operation code or command. In this case, write decoder circuit 254 is arranged to decode the operation code or command. Referring now to FIG. 3, a radio frequency identification tag system 60 includes 1) a proximately-located electrostatic exciter 62, 2) a proximately-located electrostatic reader 64, and 3) a radio frequency identification tag 300. Electrostatic exciter 62 includes a first exciter antenna element 70 and second exciter antenna element 72 coupled to an exciter circuit 71. Electrostatic reader 64 includes a reader common electrode 74 and a reader antenna element 76 coupled to a reader circuit 75. Radio frequency identification tag 300 includes a first tag antenna element 302 and a second tag antenna element 304 coupled to a tag circuit 306. In the preferred implementation of the invention shown reader common electrode 74 is coupled to ground 32. First tag antenna element 302 and second tag antenna element 304 are arranged for electrostatically coupling an exciter signal 82 and an exciter signal 84 from first exciter antenna element 70 and second exciter antenna element 72, respectively.

More particularly, electrostatic exciter 62 provides an exciter signal 82 and an exciter signal 84. When radio frequency identification tag 300 is proximate electrostatic exciter 62, exciter signal 84 is electrostatically coupled, through the air, between first exciter antenna element 70 and first tag antenna element 302 and exciter signal 82 is electrostatically coupled between exciter antenna element 72 and tag antenna element 304. Tag circuit 306 becomes energized based upon exciter signal 82 and exciter signal 84. In accordance with a programmed tag circuit state and the stored tag information of radio frequency identification tag 300, tag circuit 306 generates a read signal 86 containing a carrier signal and some or all of the stored tag information, which is communicated from tag circuit 306 to second tag antenna element 304. Read signal 86 is sent electrostatically from second tag antenna element 304 to reader antenna element 76. Electrostatic reader 64 receives read signal 86, demodulates/decodes read signal 86 to recover the stored tag information therefrom and, as appropriate, communicates the stored tag information to other system elements (not shown). In a preferred implementation, read signal 86 is a reflected signal containing the carrier signal and modulated by means of reflected load modulation based upon the stored tag information. It will be appreciated that other forms of modulation such as amplitude modulation (AM), frequency modulation (FM) or phase modulation (PM) may be used to convey the stored tag identification.

Electrostatic exciter 62 may be advantageously constructed from available tag exciter circuitry, such as for example, the aforementioned Motorola Indala Corporation's ASR-120 base station. The ASR-120 device is adapted by forming and coupling a suitable exciter electrode, for example a copper plate electrode, to each of the dipole electrode connections, thereby forming first exciter antenna element 70 and second exciter antenna element 72. As the ASR-120 is also adaptable to receive from a radio frequency identification tag the stored tag information, one will appreciate that it may be further adapted to include the reader antenna element 76 coupled to the read electrode connection.

Radio frequency identification tag 300 may be arranged for attaching to an article (not shown). In preferred applications, the article may be a loaned, leased or rented article such as, for example, a video medium, an audio medium, a computer program, a computer game, a video game or a book. The article may also be a retail sales article. Radio frequency identification tag 300 may also be arranged for attaching to a person or an animal (now shown). In a read/write embodiment, tag circuit 306 is preferably constructed from the aforementioned TEMIC e5550 circuit chip. In contrast, in an alternate read-only embodiment, tag circuit 306 is preferably constructed from a derivative of the Motorola Indala 1341 circuit chip.

In accordance with a preferred embodiment of the present invention, radio frequency identification tag 300 is arranged to include a programmable tag circuit state. Second tag antenna element 304 is arranged for receiving an "on/off"

command signal 83 from electrostatic exciter 62. Tag circuit 306 is arranged for setting the tag circuit state based upon "on/off" command signal 83. Preferably the tag circuit state is exactly one state of an "on" state and an "off" state. When the tag circuit state is "on", tag circuit 306 is arranged to generate the read signal containing the carrier signal and to couple the read signal to second tag antenna element 304. When the tag circuit state is "off", tag circuit 306 ceases to generate the read signal.

In a preferred embodiment, similar to tags 16 and 200 discussed above, the tag 300 is associated with an article, and a first state of the tag's two circuit states is used to indicate when the article is authorized for removal from a secured area, while the second state is used to indicate when the article is not authorized for removal from the secured area. The programmed nature of the tag circuit state permits high sensitivity detection. That is, radio frequency identification tag system 60 may be arranged to quickly detect the "on/off" state of the tag circuit based on generation of the read signal, i.e., the presence of the carrier signal in the read signal, without attempting to decode the stored tag information contained in the read signal. As a result, detection of the programmed tag circuit state provides effective electronic article security (EAS), while detection of the stored tag information provides asset identification and/or inventory control.

With continued reference to FIG. 3 in a read/write embodiment, electrostatic exciter 62 is arranged to transmit a transmitted write signal 88 to radio frequency identification tag 300. Within tag circuit 306, a write decoder decodes, i.e., demodulates, transmitted write signal 88 to recover the write information and to, as appropriate, update the stored tag information. Transmitted write signal 88 may also include an operation code or a command. The updated stored tag information forms the basis for read signal 86.

Figure 4:
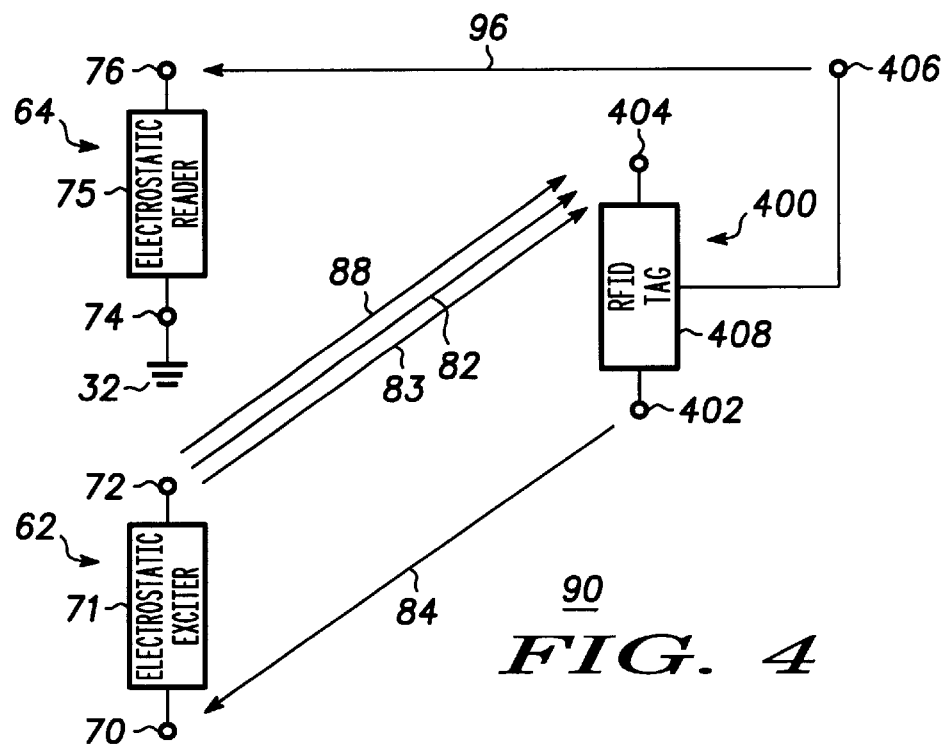
FIG. 4 is a block diagram illustration of a radio frequency identification tag system in accordance with an alternate preferred embodiment of the present invention.

Referring now to FIG. 4, a radio frequency identification tag system 90 includes 1) a proximately-located electrostatic exciter 62, 2) a proximately-located electrostatic reader 64, and 3) a radio frequency identification tag 400. Electrostatic exciter 62 and electrostatic reader 64 are arranged as discussed above with respect to radio frequency identification tag system 60. Radio frequency identification tag 400 includes a first tag antenna element 402, a second tag antenna element 404 and a third tag antenna element 406 coupled to a tag circuit 408. In the preferred implementation of the invention shown reader common electrode 74 is coupled to ground 32. First tag antenna element 402 and second tag antenna element 404 are arranged for electrostatically coupling an exciter signal 82 and an exciter signal 84 from first exciter antenna element 70 and second exciter antenna element 72, respectively.

More particularly, electrostatic exciter 62 provides an exciter signal 82 and an exciter signal 84. When radio frequency identification tag 400 is proximate electrostatic exciter 62, exciter signal 82 is electrostatically coupled, through the air, between first exciter antenna element 70 and first tag antenna element 402, and exciter signal 84 is electrostatically coupled between second exciter antenna element 72 and second tag antenna element 404. Tag circuit 408 becomes energized based upon exciter signal 82 and exciter signal 84. In accordance with a programmed tag circuit state and the stored tag information of radio frequency identification tag 400, tag circuit 408 generates a read signal 96 containing a carrier signal and some or all of the stored tag information, which is communicated from tag circuit 408 to third tag antenna element 406. Read signal 96 is sent electrostatically from third tag antenna element 406 to reader antenna element 76. Electrostatic reader 64 receives read signal 96, demodulates/decodes read signal 96 to recover the stored tag information therefrom and, as appropriate, communicates the stored tag information to other system elements (not shown). In a preferred implementation, read signal 96 is a transmitted signal containing the carrier signal and modulated by means of at least one of an amplitude modulation (AM), a frequency modulation (FM) or a phase modulation (PM) to convey the stored tag identification.

Radio frequency identification tag 400 may be arranged for attaching to an article. In preferred applications, the article may be a loaned, leased or rented article, such as, for example, a video medium, an audio medium, a computer program, a computer game, a video game or a book. The article may also be a retail sales article. Radio frequency identification tag 400 may also be arranged for attaching to a person or an animal. In a read/write embodiment, tag circuit 408 is preferably constructed from a derivative of the aforementioned TEMIC e5550 circuit chip. In contrast, in an alternate read-only embodiment, tag circuit 408 is preferably constructed from a derivative of the Motorola Indala 1341 circuit chip.

In accordance with a preferred embodiment of the present invention, radio frequency identification tag 400 is arranged to include a programmable tag circuit state. Second tag antenna element 404 is arranged for receiving the "on/off" command signal 83 from electrostatic exciter 62. Tag circuit 408 is arranged for setting the tag circuit state based upon "on/off" command signal 83. Preferably the tag circuit state is exactly one state of an "on" state and an "off" state. When the tag circuit state is "on", tag circuit 408 is arranged to generate the read signal containing the carrier signal and to couple the read signal to third tag antenna element 406. When the tag circuit state is "off", tag circuit 408 ceases to generate the read signal.

In a preferred embodiment, similar to tags 16, 200 and 300 discussed above, the tag 400 is associated with an article, and a first state of the tag's two circuit states is used to indicate when the article is authorized for removal from a secured area, while the second state is used to indicate when the article is not authorized for removal from the secured area. The programmed nature of the tag circuit state permits high sensitivity detection. That is, radio frequency identification tag system 90 may be arranged to quickly detect the "on/off" state of the tag circuit based on generation of the read signal, i.e., the presence of the carrier signal in the read signal, without attempting to decode the stored tag information contained in the read signal. As a result, detection of the programmed tag circuit state provides effective electronic article security (EAS), while detection of the stored tag information provides asset identification and/ or inventory control.

With continued reference to FIG. 4 in a read/write embodiment, electrostatic exciter 62 is arranged to transmit a transmitted write signal 88 to radio frequency identification tag 400. Within tag circuit 408, a write decoder decodes, i.e., demodulates, transmitted write signal 88 to recover the write information and to, as appropriate, update the stored tag information. Transmitted write signal 88 may also include an operation code or a command. The updated stored tag information forms the basis for read signal 96.

Fabrication of radio frequency identification tags, in accordance with the present invention, is similar to those fabrication techniques disclosed in the aforementioned commonly-assigned prior U.S. patent application Ser. No.

09/041,480 of Victor Allen Vega et al., entitled "Radio frequency identification tag arranged for magnetically storing tag state information," including the fabrication techniques disclosed in FIGS. 13–16, and those portions of the written description corresponding thereto, in the prior application.

In summary, referring again to FIG. 1 and FIG. 2, there has been disclosed a radio frequency identification tag system (10 or 201) including an electrostatic exciter 12, an electrostatic reader 14, at least one radio frequency identification tag (16 or 200); the electrostatic exciter 12 including an exciter circuit 21, an exciter common electrode 20 and an exciter antenna element 22 coupled to the exciter circuit, the exciter common electrode arranged for coupling to ground 32, the exciter circuit arranged for generating an exciter signal 34 and coupling the exciter signal to the exciter antenna element, the exciter antenna element arranged for electrostatically sending the exciter signal to the at least one radio frequency identification tag; the electrostatic reader including a reader circuit 25 and a reader common electrode 24 and a reader antenna element 26, the reader common electrode arranged for coupling to ground, the reader antenna element arranged for electrostatically receiving a read signal (38 or 210) from the at least one radio frequency identification tag and coupling the read signal to the reader circuit, the at least one radio frequency identification tag including a stored tag information, and the reader circuit arranged for detecting the stored tag information.

Referring now to the radio frequency identification tag system 10 depicted in FIG. 1, there has been disclosed a first embodiment of a radio frequency identification tag 16 including a tag circuit 15, a tag common electrode 28 and a tag antenna element 30 coupled to the tag circuit, the tag common electrode arranged for coupling to ground, the tag antenna element arranged for electrostatically receiving the exciter signal 34 and the "on/off" command signal 35 from the exciter antenna element and coupling them to the tag circuit; the tag circuit arranged for setting the tag circuit state to one of an "on" state and on "off" state, when the tag circuit state is "on", becoming energized based on the exciter signal, generating a read signal 38 and coupling the read signal to the tag antenna element; the tag antenna element arranged for electrostatically sending the read signal to the reader antenna element and the read signal being a reflected signal containing a carrier signal.

Referring now to the radio frequency identification tag system 201 depicted in FIG. 2, there has been disclosed an alternate embodiment of a radio frequency identification tag 200 including a tag circuit 208, a tag common electrode 202, a first tag antenna element 204, and a second tag antenna element 206 coupled to the tag circuit, the tag common electrode arranged for coupling to ground, the first tag antenna element arranged for electrostatically receiving the exciter signal 34 and the "on/off" command signal 35 from the exciter antenna element and coupling then to the tag circuit; the tag circuit arranged for setting the tag circuit state to one of an "on" state and an "off" state, when the tag circuit state is "on", becoming energized based on the exciter signal, generating a read signal 210 and coupling the read signal to the second tag antenna element; the second tag antenna element arranged for electrostatically sending the read signal 210 to the reader antenna element and the read signal being a transmitted signal containing a carrier signal.

In further summary and referring again to FIG. 3 and FIG. 4, there has been disclosed a radio frequency identification tag system (60 or 90) including an electrostatic exciter 62, an electrostatic reader 64, at least one radio frequency identification tag (300 or 400); the electrostatic exciter 62 including an exciter circuit 71, a first exciter antenna element 70 and a second exciter antenna element 72, the exciter circuit arranged for generating an exciter signal (82 and 84) and coupling the exciter signal to the first exciter antenna element and the second exciter antenna element, the first exciter antenna element and the second exciter antenna element arranged for electrostatically sending the exciter signal to the at least one radio frequency identification tag; the electrostatic reader including a reader circuit 75 and a reader common electrode 74 and a reader antenna element 76, the reader common electrode arranged for coupling to ground, the reader antenna element arranged for electrostatically receiving a read signal (86 or 96) from the at least one radio frequency identification tag and coupling the read signal to the reader circuit, the at least one radio frequency identification tag including a stored tag information, and the reader circuit arranged for detecting the stored tag information.

Referring now to the radio frequency identification tag system 60 depicted in FIG. 3, there has been disclosed an alternate embodiment of a radio frequency identification tag 300 including a tag circuit 306, a first tag antenna element 302 and a second tag antenna element 304 coupled to the tag circuit, the first tag antenna element and the second tag antenna element arranged for electrostatically receiving the exciter signal from the first exciter antenna element and the second exciter antenna element, respectively, and for receiving the "on/off" command signal and coupling them to the tag circuit; the tag circuit arranged for, setting the tag circuit state to one of an "on" state and an "off" state, when the tag circuit state is "on", becoming energized based on the exciter signal, generating a read signal 86 and coupling the read signal to the first tag antenna element; the first tag antenna element arranged for electrostatically sending the read signal to the reader antenna element and the read signal being a reflected signal containing a carrier signal.

Referring now to the radio frequency identification tag system 90 depicted in FIG. 4, there has been disclosed an alternate embodiment of a radio frequency identification tag 400 including a tag circuit 408, a first tag antenna element 402, a second tag antenna element 404, and a third tag antenna element 406 coupled to the tag circuit, the first tag antenna element and the second tag antenna element arranged for electrostatically receiving the exciter signal from the first exciter antenna element and the second exciter antenna element, respectively, and for receiving the "on/off" command signal and coupling them to the tag circuit; the tag circuit arranged for setting the tag circuit state to one of an "on" state and an "off" state, when the tag circuit state is "on", becoming energized based on the exciter signal, generating a read signal 96 and coupling the read signal to the third tag antenna element; the third tag antenna element arranged for electrostatically sending the read signal 96 to the reader antenna element and the read signal being a transmitted signal containing a carrier signal.

Some advantages of radio frequency identification tags with a programmable tag circuit state in accordance with the present invention, as compared to prior tags, are now discussed.

To begin, tags in accordance with the present invention effectively embody both electronic article surveillance (EAS) and radio frequency identification (RFID) technologies in a single tag circuit silicon chip. As a result, the present tags are less expensive than prior tags employing separate EAS and RFID technologies. This is because the present tags use fewer, and less expensive, components than the prior tags.

Further, because the present tags use fewer components than prior tags employing separate EAS and RFID technologies, the present tags are simpler to fabricate and easier to apply. Also, the present tags support many form factors.

Moreover, since both EAS and RFID functions of the present tags are supported exclusively by radio frequency electrostatic technology, the present tags do not utilize magnetic technology. Thus, the present tags do not require expensive and bulky magnetic components. As a result, the present tags are cheaper and lighter weight than prior tags. Also, the corresponding expensive and bulky magnetic reader is not required with the present tags.

Also, since tags of the present invention use fewer components, are simpler, cheaper, and more lightweight than prior tags using separate EAS and RFID technologies, then the present tags support more user applications than the prior tags.

While various embodiments of a radio frequency identification tag with a programmable circuit state, in accordance with the present invention, have been described hereinabove, the scope of the invention is defined by the following claims.

I claim:

1. A radio frequency identification tag comprising:
    a tag circuit and at least a first tag antenna element, wherein at least the first tag antenna element is coupled to the tag circuit,
    at least the first tag antenna element is arranged for capacitively receiving an "on/off" command signal from an electrostatic exciter and coupling the "on/off" command signal to the tag circuit,
    the tag circuit, comprising a programmable tag circuit state, is arranged for setting the programmable tag circuit state based on the "on/off" command signal, the programmable tag circuit state is set to exactly one state of an "on" state and an "off" state,
    at least the first tag antenna element is arranged for capacitively receiving an exciter signal from the electrostatic exciter and coupling the exciter signal to the tag circuit,
    the tag circuit is arranged for becoming energized based on the exciter signal and, when the programmable tag circuit state is set to "on", the tag circuit and at least the first tag antenna element modulates a first signal, and when the programmable tag circuit state is set to "off," the tag circuit and at least the first tag antenna element ceases to modulate the first signal.

2. The radio frequency identification tag of claim 1, wherein at least the first tag antenna element is further arranged for receiving a write signal from the electrostatic exciter, the write signal comprising write information, and for coupling the write signal to the tag circuit, the tag circuit is further arranged for storing the write information as a stored tag information, and the first signal is modulated based on the stored tag information.

3. The radio frequency identification tag of claim 2, wherein the first signal is modulated by means of one of an amplitude modulation, a frequency modulation, or a phase modulation.

4. The radio frequency identification tag of claim 1 wherein the tag circuit couples the first signal to at least the first tag antenna element.

5. The radio frequency identification tag of claim 1 wherein at least the first tag antenna element capacitively modulates the first signal to an external device.

6. The radio frequency identification tag of claim 1 wherein the tag circuit generates a carrier signal when the programmable tag circuit state is set to "on", and ceases to generate the carrier signal when the programmable tag circuit state is set to "off".

7. The radio frequency identification tag of claim 1 further comprising a second tag antenna element arranged for coupling to ground.

8. The radio frequency identification tag of claim 7 wherein the second tag antenna element is arranged for coupling to ground via one of the following: an article, a video medium, and audio medium, a computer program, a computer game, a video game, a book, a retail sales article, a person, and an animal.

9. The radio frequency identification tag of claim 2 wherein the first signal is modulated by means of reflected load modulation.

10. A radio frequency identification tag comprising:
    a tag circuit, a first tag antenna element, and a second tag antenna element, wherein the first tag antenna element and the second tag antenna element are coupled to the tag circuit,
    the first tag antenna element is arranged for capacitively receiving an "on/off" command signal from an electrostatic exciter and coupling the "on/off" command signal to the tag circuit,
    the tag circuit, comprising a programmable tag circuit state, arranged for setting the tag circuit state based on the "on/off" command signal, the programmable tag circuit state is set to exactly one state of an "on" state and an "off" state,
    the first tag antenna element is arranged for capacitively receiving an exciter signal from the electrostatic exciter and coupling the exciter signal to the tag circuit,
    the tag circuit is arranged for becoming energized based on the exciter signal, and when the programmable tag circuit state is set to "on", the tag circuit generates a first signal and couples the first signal to the second tag antenna element, wherein the second tag antenna element is arranged for capacitively transmitting the first signal, and when the programmable tag circuit state is set to "off," the tag circuit ceases to generate the first signal.

11. The radio frequency identification tag of claim 10, wherein the first tag antenna element is further arranged for receiving a write signal from the electrostatic exciter, the write signal comprising write information, and for coupling the write signal to the tag circuit, the tag circuit further is arranged for storing the write information as a stored tag information, and the first signal is modulated based on the stored tag information.

12. The radio frequency identification tag of claim 10 wherein the tag circuit generates a carrier signal when the programmable tag circuit state is set to "on", and ceases to generate the carrier signal when the programmable tag circuit state is set to "off".

13. The radio frequency identification tag of claim 10 further comprising a third tag antenna element coupled to the tag circuit and arranged for coupling to ground.

14. The radio frequency identification tag of claim 10 wherein the second tag antenna element capacitively transmits the first signal to an external device.

* * * * *